United States Patent Office 2,790,512
Patented Apr. 30, 1957

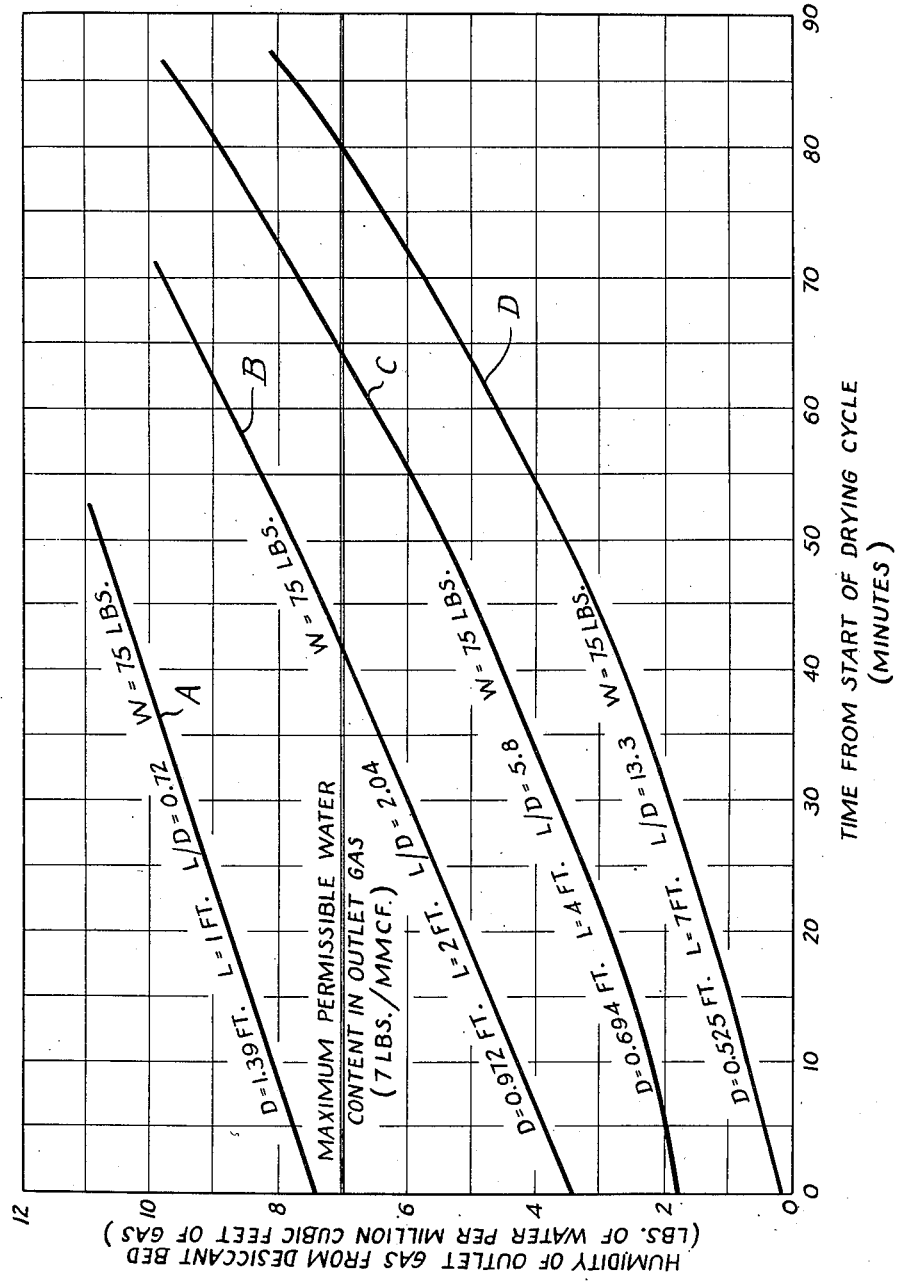

2,790,512

PROCESS FOR DEHYDRATING AND REMOVING ADSORBABLE COMPONENTS FROM GAS STREAMS

Willard M. Dow, Shreveport, La., assignor to United Gas Corporation, Shreveport, La., a corporation of Delaware Application December 22, 1953, Serial No. 399,690

5 Claims. (Cl. 183—114.2)

This invention relates to new and useful improvements in a process for dehydrating and removing adsorbable components from gas streams.

The invention relates particularly to a dehydration process which employs a solid or dry desiccant and has as its main object the improvement in the process by reason of the construction and operation of a solid desiccant bed.

As is well known, the dehydration of gas streams by means of a solid or dry desiccant material, such as bauxite, activated alumina and silica gel, has been accomplished in the desiccant type of dehydration plants. Ordinarily these plants are located at spaced points along pipe lines and function to dehydrate the gas which is gathered from various sources and locations. Since it has been the practice for one dehydration plant to handle large volumes of gas, in the order of 50 to several hundred MMCF/day, the usual commercial plant is quite large and economically expensive. In this type of plant the gas stream is passed through a desiccant bed which functions to dehydrate the stream and in some cases to remove certain hydrocarbon constituents although the main purpose of such plant is to effect a dehydration of the stream. It has been the conventional practice to employ about 500 pounds of desiccant material for each MMCF/day of gas flow through the desiccant bed so that in the larger plants a relatively large quantity of desiccant is employed. Also the contact time, that is, the length of time that the gas is in contact with the desiccant has been considered important so that the design of desiccant beds has included the factor of linear velocity; it has been the prior practice to hold the linear velocity in the lower ranges to increase contact time which means that the cross-sectional area or diameter of the bed has always been relatively large in comparison to length of the bed. Because of the assumption that a relatively large quantity of desiccant material is necessary and that linear velocity of gas flow should be maintained below a predetermined limit to assure ample contact time and thereby obtain efficient dehydration, it has not been considered to be practical to construct a smaller type dehydration plant of the desiccant type which might be applicable for use as a high capacity well head unit.

The present invention relates to a dehydration and adsorption process which employs a solid or dry desiccant bed which is relatively small as compared to the conventional or well known beds now in general use and said invention is based upon the discovery that the dynamic adsorptive capacity, as contrasted to the static adsorptive capacity, of a small desiccant bed is extremely sensitive to the geometry of the bed. It has been determined that by constructing the bed in a certain manner with a certain relationship between length and diameter or cross-sectional area and with a certain relationship between the flow rate of the gas and the weight of the desiccant material, exceptionally efficient results can be obtained with a minimum amount of desiccant material and with a resultant economic saving in related equipment.

It is, therefore, one object of this invention to provide an improved dehydrating process employing a solid desiccant wherein a minimum quantity of desiccant material may be employed to dehydrate a maximum volume of gas.

An important object of the invention is to provide an improved process including a desiccant bed having a geometry which is determined in accordance with the ratio between the weight of the desiccant divided by the rate of gas flow through the bed and in which the ratio of the length to the diameter or cross-sectional area of the bed is taken into consideration, whereby maximum dynamic adsorptive capacity for the amount of desiccant used may be obtained.

Still another object is to provide an improved dehydrating process wherein the geometry of the desiccant bed is controlled to produce maximum efficiency so that a minimum quantity of desiccant material with a resultant smaller vessel may be employed, thereby making the process and apparatus applicable to use at the well head as a relatively small unitary assembly.

Still another object is to provide a process of the character described, which employs a relatively small solid desiccant unit with a desiccant bed length greater than the desiccant bed diameter or the square root of the cross-sectional area, and with the length to diameter (or square root of the cross-sectional area) ratio being as great as pressure drop considerations across the bed will permit, whereby maximum efficiency with a minimum amount of desiccant material may be had.

Still another object is to provide an improved process employing a desiccant bed having a geometry which makes possible the use of relatively small quantities of desiccant material, in the order of 50 to 100 pounds, for dehydrating volumes of gas in the order of 2 to 5 MMCF/day.

A still further object is to provide an improved process, of the character described, which may be utilized to effectively remove or adsorb hydrocarbons, such as pentanes and heavier hydrocarbons from a gas stream.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 4 is a chart illustrating the effect of the shape of the bed on adsorptive capacity; and Figure 5 is a schematic illustration of a modified form of the desiccant bed arrangement.

Figure 1:
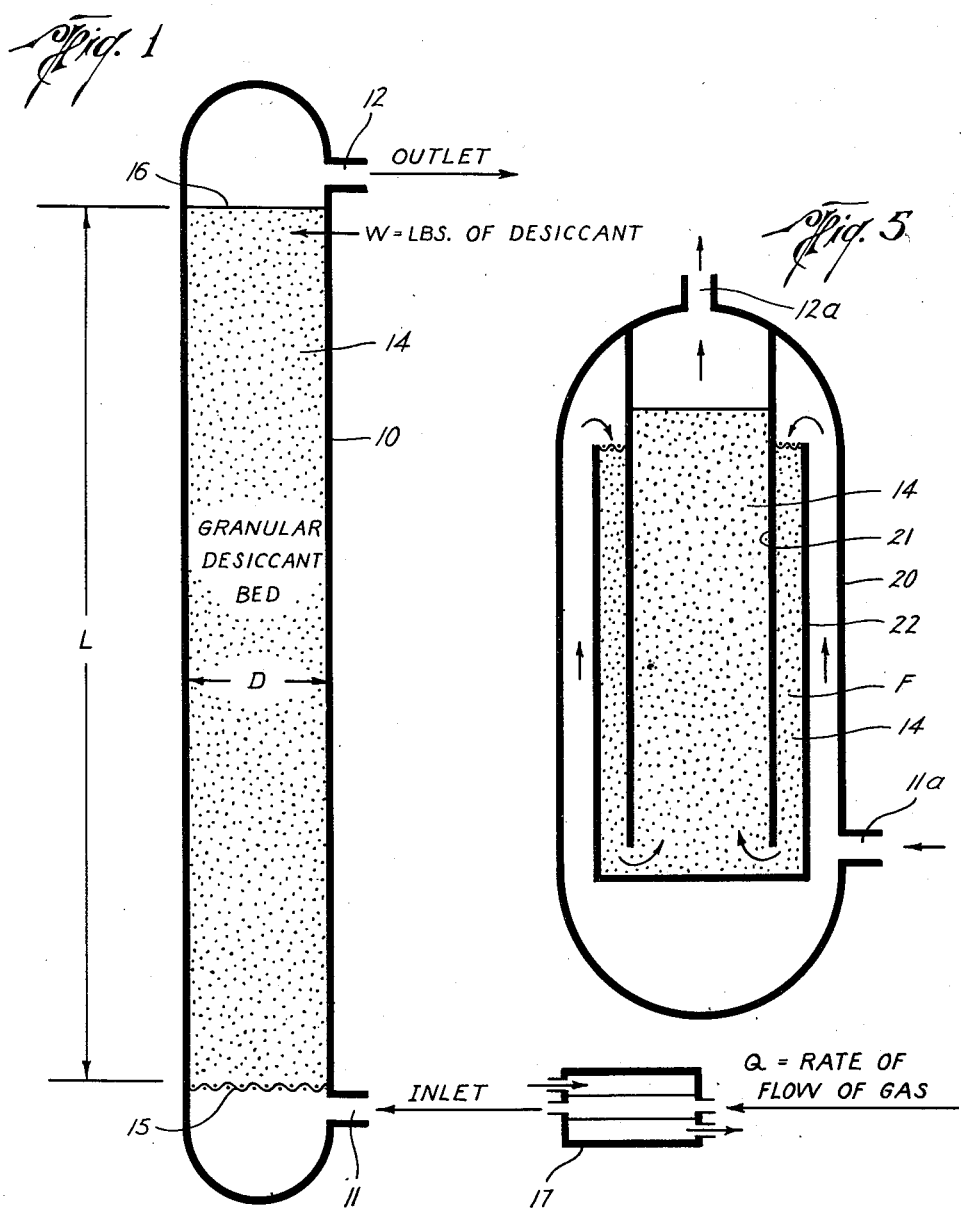
Figure 1 is a schematic illustration of dehydrating tower having a dry desiccant therein, with the bed geometry constructed in accordance with the present invention.

Conventional desiccant type dehydration units have heretofore been constructed without any particular consideration being given to the specific shape or geometry of the desiccant bed, that is, to the cross-sectional area and the length of the bed and the relationship of these dimensions to each other. Rather, the problem has been approached from a standpoint of pounds of desiccant per million cubic feet of gas to be dehydrated, and, as an average, conventional natural gas dehydration units provide about 500 pounds of desiccant material for each MMCF/day of gas flow through the desiccant bed.

Some consideration has been given to linear velocity of the gas flow through the bed and generally the bed has been arranged of sufficient cross-sectional area with respect to length to hold the linear velocity in the lower ranges since it has been believed that dehydration efficiency is increased when the gas flows through the bed under a relatively low linear velocity. Actually, the particular dimensions, such as cross-sectional area and length of the bed, have been more or less determined by the size and shape of the vessel or tower in which the desiccant material is disposed and the geometry of the bed itself has been considered of secondary importance. The size and shape of the vessel or tower is selected primarily on the basis of and in accordance with the pressures under which the unit is to operate. Thus, if operating pressures are of the order of 2000 p. s. i., then a vessel of a diameter and height which is most economical to manufacture and which will withstand such pressures is provided; obviously diameter is usually held to a minimum because lesser diameter vessels may use thinner guage materials to withstand the higher pressure with a resultant saving in manufacturing costs.

Therefore, it may be said that in the design of the usual or conventional desiccant type dehydration units, it has been generally assumed that approximately 500 pounds of desiccant material is necessary for the dehydration of each MMCF/day of gas flow through the desiccant bed and the amount of desiccant material is thus fixed in accordance with the volume of gas to be dehydrated. The particular bed geometry has received no particular consideration, it being the practice to design a tower in accordance with pressure conditions to be encountered and of sufficient size not only to contain the amount of desiccant considered necessary to efficiently accomplish the result but also of such size as to maintain the velocity of gas flow through the bed within a relatively low range.

As a specific example, a conventional dehydration unit now in use containing 44,000 pounds of desiccant material and having a rate of gas flow through the desiccant bed of 50 MMCF/day is constructed with the desiccant bed 6 feet in diameter and 31 feet in length. The size of the tower which contains the desiccant material was determined primarily by pressure conditions, that is, the diameter was made as small as possible to permit the thinner gauge material to be used and was increased in length as required to contain the 44,000 pounds of desiccant material; at the same time the diameter was selected to prevent an excessive linear velocity of gas through the bed. Thus, no particular consideration was given to the shape or size of the bed itself except as it relates to the desired relatively low linear velocity, the unit merely being designed, constructed and operated to adsorb a predetermined weight of water regardless of the shape or geometry of said desiccant bed.

The conventional unit contains a relatively large quantity of desiccant as compared to the rate of gas flow therethrough and for this reason the adsorption capacity is not influenced by the particular shape of the desiccant bed. I have determined that where the ratio of the weight of the desiccant (in pounds) divided by the rate of gas flow through the bed (in MMCF/day) is relatively high, the geometry of the desiccant bed has no particular influence on the dynamic adsorption capacity of the desiccant bed; in fact, such influence is negligible compared to the influence of other well known factors, such as type of desiccant, water content of gas, adsorption temperature and bed-fouling characteristics of the heavy hydrocarbon constituents of the natural gas stream.

I have also determined that where smaller amounts of desiccant material are employed in relation to the rate of gas flow through the bed, the particular shape or geometry of the bed becomes extremely important and influences the dynamic adsorption capacity of the bed. Whether or not the geometry or shape of the bed influences adsorption capacity is dependent upon a function of the ratio of the weight of the desiccant (in pounds) divided by the rate of gas flow (in MMCF/day) through the bed and is also dependent upon the length of the flow path through the desiccant bed, that is, the actual length of the desiccant bed itself.

Considering the specific example of a conventional unit heretofore referred to, where 44,000 pounds of desiccant material is employed and the rate of gas flow is 50 MMCF/day, the W/Q ratio (where W is the weight of the desiccant in pounds and Q is the rate of gas flow in MMCF/day) is 44,000 divided by 50, or 880. This is a relatively high W/Q ratio which places the unit in a region in which actual performance data have shown that the geometry of the bed has no particular influence on performance. In a tower 6 feet in diameter and 31 feet in length, the dehydration efficiency or performance will be substantially the same as if the desiccant bed geometry was changed to a different diameter and length but still containing the same weight of desiccant (44,000 pounds); for example, 8 feet in diameter and 17.4 feet in length or 12 feet in diameter and 7.7 feet in length. Therefore, in the conventional unit where a large amount of desiccant is employed bed geometry has a negligible influence on results.

However, where the W/Q ratio of a unit is relatively low, the bed geometry becomes an influencing factor in the efficiency of the unit. Taking as an example a unit which employs 75 pounds of desiccant and the rate of gas flow therethrough is 6 MMCF/day, the W/Q ratio would be the weight of the desiccant in pounds (75) divided by the rate of gas flow in MMCF/day (6) through the bed, or a W/Q ratio of 12.5. In this instance, the dynamic adsorptive capacity of the desiccant is greatly influenced by the shape or geometry of the bed and in order to function properly to perform a dehydration operation, the bed geometry must be arranged within certain limits. Since the length of the flow path through the desiccant bed is also a factor which influences performance, it has been determined that in the "small" units where relatively small amounts of desiccant in relationship to rate of gas flow therethrough are employed, the length of the bed must be predetermined and properly related to the diameter or cross-sectional area of the bed and unless such proper relationship is had efficient performance will not be produced. On the other hand, where the shape and geometry of the so-called small bed is arranged so that its length is properly related to its diameter or cross-sectional area, efficient dehydration of large volumes of gas by a relatively small quantity of desiccant material may be effected.

The distinction between "large" and "small" desiccant beds which determines whether the geometry or shape of the bed influences the dynamic adsorption capacity is, as above pointed out, a function of the ratio W/Q. Also the length of the desiccant bed or the length of the flow path through the bed is a factor which must be considered. Through actual tests, I have determined that whenever the quantity $(W/Q \times L^{1.44})$ is greater than 1000, the desiccant bed may be considered a large bed whose performance is independent of the shape of the bed; when the quantity $(W/Q \times L^{1.44})$ is less than 1000 the desiccant bed may be considered a small bed, the performance of which is influenced by the shape or geometry of the bed. In the formula $(W/Q \times L^{1.44})$, W is the weight of the desiccant in pounds, Q is the rate of gas flow through the desiccant bed in MMCF/day and L is the length of the desiccant bed in feet. This criterion is plotted in the chart, Figure 2, with the curve 20 on said chart representing the general dividing line between a conventional or "large" dehydration unit and a "small"

dehydration unit constructed in accordance with the principles of the present invention.

For "large" desiccant beds, i. e., large quantities of desiccant relative to amount of gas flowing through the bed and long bed lengths, the performance of the desiccant bed will be independent of the shape or geometry of the bed. This corresponds to the region to the right of the dividing curve in Figure 2 ($W/Q \times L^{1.44}$) larger than 1,000. For "small" desiccant beds, i. e., small quantities of desiccant beds, i. e., small quantities of desiccant relative to amount of gas flowing through the bed and short bed lengths, the performance of the desiccant bed will be extremely sensitive to the shape of the bed. This corresponds to the region to the left of the dividing curve in Figure 2 ($W/Q \times L^{1.44}$) less than 1,000. As I have discovered by actual tests, the performance of a small desiccant bed is so dependent upon the geometry of the bed, completely unlike large desiccant beds, that a completely inefficient and unusable small desiccant bed may be converted readily to an efficient and practical desiccant bed by rearranging the same weight of desiccant into a favorable geometry. Thus I discovered that it is possible to employ a process which uses a small amount of desiccant relative to the amount of gas flowing through the bed (W/Q of the order of magnitude of 10 to 50 rather than 200 to 1,000 of conventional design) to dehydrate natural gas providing the small amount of desiccant is arranged in a properly shaped bed.

As referred to herein and in the appended claims, the term "small" desiccant bed is one in which the quantity ($W/Q \times L^{1.44}$) is smaller than 1000 and the present invention relates to a process which employs such small beds. The general division between the "small" desiccant bed and the "large" desiccant bed (where the quantity $W/Q \times L^{1.44}$ is larger than 1000) is clearly illustrated by the dividing curve 20 of Figure 2. As is evident from Figure 2, whenever W/Q is large the region to the left of curve 20 is very limited and, in fact, is essentially nonexistent at very high W/Q ratios. This means from a practical point of view that whenever the W/Q ratio is appreciably greater than 100, a practical dehyration unit will invariably be a large unit ($W/Q \times L^{1.44}$ larger than 1,000) whose performance will be independent of its shape. Although theoretically a unit with a large W/Q ratio could have such a short bed length as to fall in the region to the left of curve 20, from a practical standpoint this would not be probable. For example, a desiccant bed with a W/Q equal to 500, which is representative of the conventional design, would have to have a bed length less than one foot to fall in the region to the left of curve 20. This would mean that a conventional unit handling 30 MMCF/day of natural gas would have to have a tower height less than one foot and a tower diameter greater than 20 feet in order to fall in the region to the left of curve 20. Such a design would be totally impractical. As a comparison, the usual desiccant tower which is considered reasonable for a pressure vessel of this character is ordinarily 4 to 5 feet in diameter and about 20 feet in length. Thus it is obvious that the performance of conventionally designed dehydration units (W/Q ratios of 200 to 1,000) is independent of and is unaffected by the bed geometry.

Figure 2:
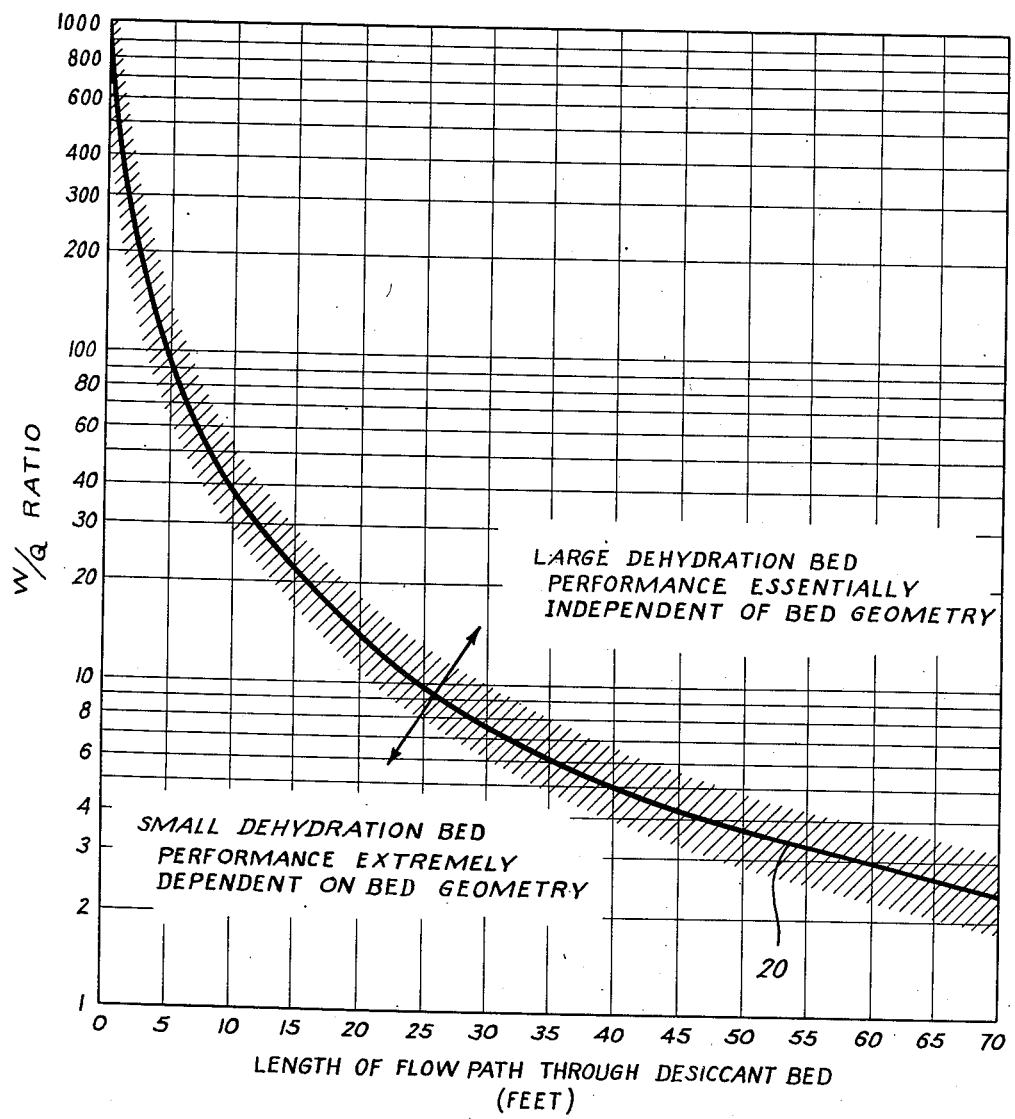
Figure 2 is a chart illustrating the distinction factors between large desiccant bed, which are independent of bed geometry and small beds which are dependent upon the bed geometry.

In a small unit having a W/Q ratio appreciably smaller than 100, the length of the flow path through the desiccant bed will, in following the formula ($W/Q \times L^{1.44}$), always be short enough to fall within the region to the left of the dividing curve 20 in Figure 2. For example, as can be seen from Figure 2 when the W/Q ratio is equal to 10 the length of the bed has to be greater than 25 feet in order to fall to the right of curve 20. Such a long length for a small desiccant bed represents an extremely impractical design. A desiccant bed with a W/Q ratio of 10 and a bed length of 25 feet would require a pressure drop of over 2,000 p. s. i. across the desiccant bed in order to handle a reasonable amount of natural gas and such a pressure drop would be intolerable. Practical considerations usually demand that the pressure drop across the desiccant bed should be about 10 to 30 p. s. i., although in special applications such as well head dehydration at high static pressure of several thousand p. s. i., a pressure drop of 100 to 200 may be tolerated. Thus the length of the small desiccant bed is necessarily limited by consideration of the pressure drop across the bed. This means that a practical design for a small desiccant bed (W/Q ratio less than 50) must necessarily fall in the region to the left of the dividing curve 20 in Figure 2. A practical design for a dehydration unit with a W/Q ratio equal to or slightly greater than, or slightly less than 100, could be such that it could fall on either side of the dividing curve 20. In summary then, the distinction between a "large" and a "small" dehydration bed which determines whether its performance will be influenced by the bed geometry is whether the quantity ($W/Q \times L^{1.44}$) is larger or smaller than 1,000. From a practical viewpoint, if the ratio W/Q is greater than 150 the unit will always be independent of the bed geometry, and if the ratio W/Q is less than 50 the performance of the unit will always be extremely sensitive to the bed geometry.

Figure 3:
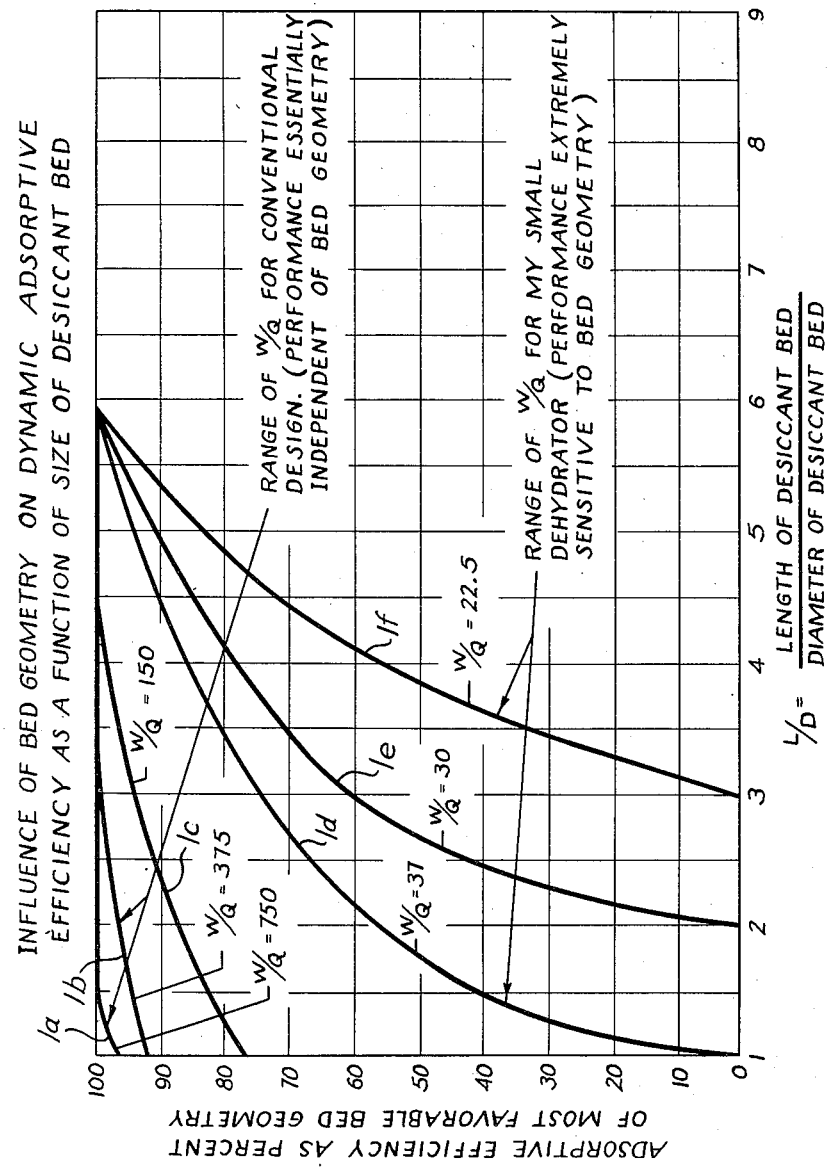
Figure 3 is a chart illustrating the influence of bed geometry on the dynamic adsorption efficiency as a function of the size of the desiccant bed.

The striking difference between large and small dehydration units with respect to the influence of desiccant bed geometry on their performance is shown in Figure 3. This figure shows by curves 1a through 1f inclusive the relative performance of various sizes of dehydration units (W/Q ratios from 22.5 to 750) as a function of the bed geometry (L/D—where L is length and D is either diameter in feet in cylindrical vessels or square root of the cross-sectional area in non-cylindrical vessels). Each curve for a constant W/Q ratio in Figure 3 represents the performance of a desiccant bed as a function of the bed geometry (L/D) with all other factors, i. e., gas flow rate, temperature, pressure, total weight of desiccant and amount of water in the inlet gas stream, held constant. The dynamic adsorption efficiency is illustrated relative to the efficiency of what is considered a favorable bed geometry ($L/D = 6$). The information on Figure 3 was obtained by comparing the available adsorption time provided by the particular bed geometry under consideration with the adsorption time provided by the unit with an L/D ratio of 6. The useful adsorption time was considered as the time from the start of an adsorption period to the time that the residual adsorbate content of the outlet gas stream from the adsorption bed had increased to ten percent of the adsorbate content in the inlet gas stream. Similar conditions were maintained for all six values of the W/Q ratio so that the influences on the adsorption efficiency shown in Figure 3 are due to bed geometry only. The only difference between the various cases of constant W/Q ratio is overall size of the desiccant bed. The adsorption temperature, adsorption pressure, and type of desiccant are identical for all cases. The linear gas flow through the desiccant bed is the same for any particular bed geometry for all six cases of W/Q ratio. Therefore, the difference in the influence of bed geometry on the adsorption efficiency for the various cases illustrated in Figure 3 is due to size of the desiccant bed (W/Q) alone and is not due to differences in gas velocity through the bed or some other factor.

Figure 3 shows that for a bed with a W/Q ratio of 750, curve 1a, that the desiccant bed can be arranged in any particular shape from a length six times the diameter to a length equal to the diameter (all shapes containing the same weight of desiccant) with essentially no difference in the dynamic adsorption capacities of the various shapes. However, if a bed with a W/Q ratio of 22.5, curve 1f, where arranged in the identical shapes under the identical operating conditions as the larger bed, it would demonstrate an exceedingly sensitive dependency on bed geometry. In fact, for bed geometries of L/D less than three, it would completely fail to function as an effective adsorption bed—the adsorbate content of the outlet gas would be greater than ten percent of the inlet content from the very beginning of the adsorption period. But by the simple expedient of rearranging the desiccant bed so that the length is substantially six times or more the bed diameter, rather than three times (both shapes containing the same amount of desiccant) a completely ineffective adsorption bed is transformed into a very efficient adsorption bed. Thus the difference in the influence of bed geometry on adsorption efficiency between a large bed (W/Q ratio large) and a small bed (W/Q ratio small) is not a mere nuance but represents a difference between a completely insignificant factor and a factor which is vital to the successful operation of an adsorption bed.

Heretofore it has not been deemed possible to dehydrate a relatively large volume of gas, for example, in the order of 6 MMCF/day with a bed containing only a relatively small quantity of desiccant, for example, in the order of 75 pounds; however, by arranging the shape or geometry of the bed in the manner of the present invention, the dynamic adsorptive capacity of the bed is fully utilized and efficient dehydration of a large volume of gas with a small quantity of desiccant is possible.

In Figure 1 of the drawings a dehydration unit having its desiccant bed arranged in accordance with the present invention is illustrated. In this figure the numeral 10 designates a vessel having an inlet 11 at its lower end and an outlet 12 at its upper end, whereby a gas stream to be dehydrated may be directed through the vessel. The interior of the vessel contains a granular desiccant bed 14 which is suitably mounted therein. The desiccant may consist of any of the commonly used desiccants, such as bauxite, activated alumina, silica gel, Florite, or Sova beads and as illustrated is supported upon a screen or other open type support 15. The upper end indicated at 16 of the bed is normally below the outlet 12 and the gas stream from inlet 11 flows upwardly through the bed, contacts the desiccant and is thereby dehydrated and is then discharged through outlet 12. As is well known, when the desiccant becomes saturated, gas flow is directed into a second desiccant vessel (not shown) while the saturated bed is regenerated, usually by the circulation of hot gas through the bed in a reverse direction. It has been found that it is desirable to operate the adsorption unit at as low a temperature as is feasible, and therefore, if desired a heat exchanger 17 may be connected in inlet line 11 to cool the incoming gas; of course, only sufficient cooling is carried out to cool the gas stream without the formation of hydrates.

The present invention resides in a process employing a desiccant bed 14 of a particular geometry. As has been noted, where certain ratios of the weight of the desiccant to the rate of gas flowing through the bed are involved the particular bed geometry definitely influences the adsorptive capacity of the desiccant and by properly arranging the bed geometry, maximum efficiency may be obtained. In the process, the rate of flow of the gas is predetermined and controlled to maintain the proper relationship between the gas flow and the weight of the desiccant.

Assuming the desiccant bed 14 to contain 75 pounds of desiccant and assuming that the rate of gas flow through the bed is 6 MMCF/day, it is necessary that the length L of the bed be greater than the diameter D or the equivalent diameter if the bed be non-cylindrical. As is well known in fluid dynamics, the diameter of a cylindrical passage and the equivalent diameter of all non-cylindrical passages is equal to four times the hydraulic radius of the passage. In certain non-cylindrical passages, such as one which is square in cross-section, the equivalent diameter is equal to the square root of the cross-sectional area. It is further desirable that this length be as much greater than the diameter (or equivalent diameter) as the pressure drop consideration permit. As has been pointed out, pressure drop across a desiccant bed must be held within certain limits in accordance with practical operating conditions and thus, the factor which defines the upper limit of length to diameter ratio (L/D) of the bed is the amount of pressure drop across the bed which may be tolerated.

In the smaller desiccant bed, optimum performance would be obtained by arranging the desiccant material in a long path of extremely small diameter or cross-sectional area; however, it is obvious that the smaller the diameter or cross-section the greater the pressure drop and therefore, when the length reaches that point at which excessive pressure drop occurs said length is at its upper limit. The lower limit of length is obviously fixed by the fact that the length must be greater than diameter or in the case of non-cylindrical beds, greater than the square root of the cross-sectional area.

Reference to Figure 4 clearly indicates the influence of the shape or geometry of the bed, so far as its length to diameter (L/D) ratio is concerned, on the adsorptive capacity. Referring to Figure 4, where the amount of desiccant is 75 pounds and the rate of gas flow is 6 MMCF/day the arrangement of the desiccant in a bed having a diameter of 1.39 feet and a length of 1 foot provides a unit which is unsatisfactory for the purpose. As is well known, natural gas must be dehydrated to 7 pounds of water per MMCF of gas for delivery to pipe lines and by observing Figure 4, it will be seen that the curve A representative of a desiccant bed which is less in length than in diameter shows that no satisfactory dehydration will occur because the gas is never dehydrated to less than 7.5 pounds of water per MMCF.

The curve B on Figure 4 represents a desiccant bed having a diameter of .972 and a length of 2 feet. This change in the shape or geometry of the bed provides an L/D ratio of 2.04, and in such case satisfactory dehydration will occur for a period of 40 minutes after which dehydration to specification cannot be accomplished. Curve C represents a further change in the geometry of the bed, in that diameter is .694 while length is 4 feet. This provides an L/D ratio of 5.8 and is satisfactory because specification dehydration occurs for a period of approximately 65 minutes.

Curve D on Figure 4 illustrates a most desirable geometry for a desiccant bed containing 75 pounds; in this case the diameter has been reduced to .525 feet, while length is 7 feet, giving an L/D ratio of 13.3. As shown by the curve D a desiccant bed arranged in this manner will provide satisfactory dehydration with a flow rate of 6 MMCF/day for a period of 80 minutes. Such a cycle has been found satisfactory and practical performance is had. The large L/D ratios not only provide for a longer time cycle but as is evident from Figure 4 remove the water more efficiently to give a lower average water content in the outgoing gas stream during the adsorption cycle. Of course, it is understood that the shape or geometry of the beds represented by the curves B and C are satisfactory for effecting dehydration but obviously are not as efficient because the time cycle during which proper dehydration is produced is less.

The curves plotted on Figure 4 and the information in connection therewith is the result of actual tests of performances of the desiccant beds of the four different shapes all including the same weight of desiccant. The natural gas stream of 6 MMCF/day was directed through the desiccant bed under the operating conditions of 100° Fahrenheit and 2000 p. s. i. Figure 4 clearly illustrates that maximum efficiency and performance is obtained in the unit when the L/D ratio is increased and as has heretofore been mentioned, it is desirable that this ratio be as great as possible within the limits of pressure drop considerations.

In Figure 1 the desiccant bed is illustrated as substantially cylindrical so that the desiccant bed is of a relatively long length. However, the invention may be carried out by arranging the desiccant bed of a cross-sectional shape other than cylindrical or the bed may be arranged in the manner illustrated in Figure 5. In this form the length of the flow path of the gas is of sufficient length, but due to the construction of the tower, said tower may be reduced in height. Referring to Figure 5 the tower 20 is formed with an inlet 11a at its lower end and an outlet 12a at its upper end. A cylindrical casing 21 is disposed axially within the tower and has its lower end open. A second cylindrical casing 22 is disposed within the tower and surrounds the inner casing 21 in spaced relation thereto, whereby an annular flow area F is provided between the casing. The upper end of the outer casing 22 is open so that incoming gas from the inlet 11a enters the annular space F, flows downwardly through casing 22 and then upwardly through inner casing 21. The desiccant material 14 is disposed within the inner casing and is also contained within the annular flow area F. It is preferable that the cross-sectional area of the annular flow space F be substantially the same as the cross-sectional area of the inner casing 14 so that the cross-sectional area of the bed is substantially constant throughout its length. The length of the bed is actually the distance which the gas travels as it passes downwardly through the annular flow space F and then upwardly through the inner casing 21.

The arrangement shown in Figure 5 will operate in exactly the same manner as described with reference to the desiccant bed shown in Figure 1. In both instances the desiccant bed has a length which is greater than the diameter or square root of the cross-sectional area and the advantages of the present invention are accomplished. As has been noted by constructing the tower in the manner illustrated in Figure 5 the over-all height of the tower may be reduced while still providing the proper W/Q ratio as well as the proper L/D ratio.

The advantages of employing a process which maintains rate of flow of the gas in the desired relationship to a desiccant bed constructed in the manner described herein are obvious. Heretofore it has been assumed that from 2,000 to 3,000 pounds of desiccant is necessary to properly dehydrate 6 MMCF of gas per day whereas by means of the present invention efficient dehydration may be effected with only 75 pounds of desiccant material. Thus the vessel containing the desiccant can be considerably smaller in size which greatly decreases cost and also the associated equipment can be proportionately smaller and less expensive. The use of a small desiccant bed in dehydrating relatively large volumes of gas makes possible the construction of a dehydrator unit in the form of a skid mounted unitary assembly which may be readily moved to the well location and employed at the well head for the purpose of dehydrating large volumes of gas.

By locating a dehydrating apparatus at the well head, the process of dehydration of the gas is carried out prior to the flow of gas through the gathering system leading to the main pipe line and is of course carried out prior to the gas entering such main pipe line. It has been found that considerable difficulty has been encountered with corrosion due to the gas from the well flowing long distances through the pipe or line prior to reaching a dehydration plant and these difficulties are overcome when the dehydration occurs at the well head. The particular unit herein disclosed being readily applicable to well head installation provides the advantage of reducing the corrosion difficulties in the line.

As has been noted, the invention is applicable to a desiccant unit where the quantity $(W/Q \times L^{1.44})$ is less than 1000. In this general class of units which are referred to herein as small units the bed geometry is an influencing factor on performance and in order to properly arrange the shape or geometry of the bed, the length of the bed must be greater than the diameter; in the case of noncylindrical beds the length must be greater than the square root of the cross-sectional area. The length in both cases should be as much greater as the pressure drop considerations will tolerate. For purposes of this application, the letter "D" indicates the diameter of the cylindrical vessel shown in Figure 1 but the indication "D" is also meant to include the square root of the cross-sectional area in the case of non-cylindrical vessels.

Although the example given herein and illustrated in Figure 4 has dealt with 75 pounds of desiccant for dehydrating 6 MMCF of gas per day, it is evident that a lesser amount of desiccant material could be employed where the rate of gas flow therethrough is somewhat less than the 6 MMCF/day figure which has been used herein. It is contemplated that considerably less than 50 pounds of desiccant material (in the above example 12.5 pounds was employed) per each MMCF of gas per day may be employed in efficiently dehydrating the gas. By comparing this figure to the conventional system which employs 500 pounds of desiccant per MMCF, the economic advantages are evident.

The invention has been described as employed for dehydrating natural gas but it is obvious that adsorbent beds having their geometry controlled in accordance with the principles set forth herein may be used for the adsorption of heavy hydrocarbon constituents, such as pentane, hexanes, heptanes plus and benzene from natural gas. The cross-sectional shape of the bed may vary although a cylindrical shape is probably the most practical. The particular desiccant which is employed is subject to variation because it has been found that the influence of bed geometry on the dynamic adsorptive capacity of a solid desiccant bed is the same regardless of the desiccant used. It might be noted that the influence of bed geometry on the relative performance of a given quantity of desiccant is independent of the adsorption temperature and adsorption pressure although it is recognized that it would be desirable to cool the gas as much as possible without formation of hydrates prior to its entry into the unit. It is also recognized that it is desirable to operate the unit at as high an adsorption pressure as possible because under such higher pressure conditions the gas stream contains less water vapor; also at higher pressures larger pressure drops across the desiccant bed are possible without interfering with over-all operation.

The foregoing disclosure and description of the invention is illustrative and explanatory thereof and various changes in the size, shape and materials, as well as in the details of the illustrated construction may be made, within the scope of the appended claims, without departing from the spirit of the invention.

Having described the invention, I claim:

1. A process for dehydrating and adsorbing removable components from a gas stream which includes, flowing the gas stream through a vessel having a bed of solid adsorbent material therein, directing said gas stream through said bed to remove water vapor and other adsorbable components from the stream, and maintaining a predetermined rate of gas flow through the adsorbent bed, the physical size of said bed being such that the product is less than 1000 when determined by the formula $W/Q \times L^{1.44}$, where W is the weight of the adsorbent material in pounds, Q is the predetermined rate of gas flow through the bed in MMCF/day and L is the length of the bed in feet in the direction of the gas flow through the bed, said bed also having the length L greater than D where D is four times the hydraulic radius of said bed in feet.

2. A process for dehydrating and adsorbing removable components from a gas stream which includes, flowing the gas stream through a vessel having a bed of solid adsorbent material therein, directing said gas stream through said bed to remove water vapor and other adsorbable components from the stream, and maintaining a predetermined rate of gas flow through the adsorbent bed, the physical size of said bed being such that the product is less than 1000 when determined by the formula $W/Q \times L^{1.44}$, where W is the weight of the adsorbent material in pounds, Q is the predetermined rate of gas flow through the bed in MMCF/day and L is the length of the bed in feet in the direction of the gas flow through the bed, said bed being cylindrical in cross section perpendicular to the direction of gas flow and having the length L greater than D where D is the diameter of the bed in feet.

3. A process for dehydrating and adsorbing removable components from a gas stream which includes, flowing the gas stream through a vessel having a bed of solid adsorbent material therein, directing said gas stream through said bed to remove water vapor and other adsorbable components from the stream, and maintaining a predetermined rate of gas flow through the adsorbent bed, the physical size of said bed being such that the product is less than 1000 when determined by the formula $W/Q \times L^{1.44}$, where W is the weight of the adsorbent material in pounds, Q is the predetermined rate of gas flow through the bed in MMCF/day and L is the length of the bed in feet in the direction of the gas flow through the bed, said bed being non-cylindrical in cross-section and having a substantially constant cross-sectional area throughout its length, the length L of the bed being greater than the square root of said cross-sectional area in feet.

4. A process for dehydrating and adsorbing removable components from a gas stream which includes, flowing the gas stream through a vessel having a bed of solid adsorbent material therein, directing said gas stream through said bed to remove water vapor and other adsorbable components from the stream, and maintaining a predetermined rate of gas flow through the adsorbent bed, the quantity of adsorbent material being so small that the ratio of the weight of adsorbent material in pounds divided by the predetermined rate of gas flow in millions of standard cubic feet per day passing through said bed produces a quotient which is less than 50, said bed also having a length in feet parallel to the direction of gas flow which is greater than four times the hydraulic radius of said bed in feet.

5. A process for dehydrating and adsorbing removable components from a gas stream which includes, flowing the gas stream through a vessel having a bed of solid adsorbent material therein, directing said gas stream through said bed to remove water vapor and other adsorbable components from the stream, and maintaining a predetermined rate of gas flow through the adsorbent bed, the quantity of adsorbent material being so small that the ratio of the weight of adsorbent material in pounds divided by the predetermined rate of gas flow in millions of standard cubic feet per day passing through said bed produces a quotient which is less than 50, said bed being cylindrical in cross-section perpendicular to the direction of gas flow and having a length in feet which is greater than the diameter of the bed in feet.

References Cited in the file of this patent

UNITED STATES PATENTS

| 2,593,132 | Gannon | Apr. 15, 1952 |
| 2,629,460 | Maki | Feb. 24, 1953 |
| 2,709,496 | Baker | May 31, 1955 |